(12) United States Patent
Rhee et al.

(10) Patent No.: US 12,183,886 B2
(45) Date of Patent: Dec. 31, 2024

(54) ELECTROLYTE SOLUTION FOR LITHIUM SECONDARY BATTERY AND LITHIUM SECONDARY BATTERY INCLUDING THE SAME

(71) Applicants: Hyundai Motor Company, Seoul (KR); Kia Corporation, Seoul (KR); The Industry & Academic Cooperation in Chungnam National University (IAC), Daejeon (KR)

(72) Inventors: Jun Ki Rhee, Gyeonggi-do (KR); Yoon Sung Lee, Gyeonggi-do (KR); Sung Ho Ban, Gyeonggi-do (KR); Seung Min Oh, Incheon (KR); Ko Eun Kim, Chungcheongbuk-do (KR); Seung Wan Song, Sejong (KR); Gyeong Jun Chung, Daejeon (KR)

(73) Assignees: Hyundai Motor Company, Seoul (KR); Kia Corporation, Seoul (KR); The Industry & Academic Cooperation in Chungnam National University (IAC), Daejeon (KR)

( * ) Notice: Subject to any disclaimer, the term of this patent is extended or adjusted under 35 U.S.C. 154(b) by 494 days.

(21) Appl. No.: 17/454,205

(22) Filed: Nov. 9, 2021

(65) Prior Publication Data
US 2022/0320582 A1  Oct. 6, 2022

(30) Foreign Application Priority Data
Apr. 1, 2021  (KR) .................. 10-2021-0042801

(51) Int. Cl.
| | | |
|---|---|---|
| *H01M 10/0567* | (2010.01) | |
| *H01M 10/0525* | (2010.01) | |
| *H01M 10/0568* | (2010.01) | |
| *H01M 10/0569* | (2010.01) | |

(52) U.S. Cl.
CPC ... *H01M 10/0567* (2013.01); *H01M 10/0525* (2013.01); *H01M 10/0568* (2013.01); *H01M 10/0569* (2013.01); *H01M 2220/20* (2013.01); *H01M 2300/0028* (2013.01)

(58) Field of Classification Search
CPC ........ H01M 10/0567; H01M 10/0525; H01M 10/0568; H01M 10/0569; H01M 2220/20; H01M 2300/0028
See application file for complete search history.

(56) References Cited

U.S. PATENT DOCUMENTS

| | | | | |
|---|---|---|---|---|
| 2004/0248014 A1* | 12/2004 | West | ................ | H01M 10/0569 429/189 |
| 2019/0312308 A1* | 10/2019 | Park | ................ | H01M 10/0567 |
| 2020/0399212 A1* | 12/2020 | Sanchez Diez | ....... | C07C 303/38 |

FOREIGN PATENT DOCUMENTS

| | | | |
|---|---|---|---|
| JP | 2010282836 A | * | 12/2010 |
| KR | 101264435 B1 | | 5/2013 |
| KR | 20140120174 A | * | 10/2014 |

* cited by examiner

*Primary Examiner* — Ula C Ruddock
*Assistant Examiner* — Olivia Mason Ruggiero
(74) *Attorney, Agent, or Firm* — Fox Rothschild LLP

(57) ABSTRACT

Disclosed are an electrolyte solution and an additive thereof, which may improve electrochemical properties of a lithium secondary battery.

10 Claims, 5 Drawing Sheets

ELECTROLYTE SOLUTION FOR LITHIUM SECONDARY BATTERY AND LITHIUM SECONDARY BATTERY INCLUDING THE SAME

CROSS REFERENCE TO RELATED APPLICATION

The present application claims priority to Korean Patent Application No. 10-2021-0042801, filed Apr. 1, 2021, the entire contents of which is incorporated herein for all purposes by this reference.

TECHNICAL FIELD

The present invention relates to an electrolyte solution forming a lithium secondary battery and a lithium secondary battery including the electrolyte solution. The electrolyte solution additive which may improve electrochemical properties of a lithium secondary battery.

BACKGROUND

A lithium secondary battery produces electric energy by repeating insertion and desorption of lithium ions in a positive electrode and a negative electrode. The lithium secondary battery may be recharged many times and reused, and has a high voltage to be used as a power source of various electronic devices and electric vehicles.

The core of commercialization of the electric vehicle is to allow traveling of 500 km or more on a single charge. A traveling distance of the electric vehicle is closely related to a capacity of the lithium secondary battery, and the lithium secondary battery having a higher capacity is the core of commercialization of the electric vehicle.

The lithium secondary battery having a greater capacity is obtained by developing a material of a positive electrode active material used in the production of a positive electrode, and in particular, the lithium secondary battery may have a higher capacity by increasing a content of Ni in a NCM-based material in the spotlight as a positive electrode material.

However, the NCM-based positive electrode active material having an increased content of Ni may accelerate deterioration of a battery with more use of the battery due to high interfacial reactivity of Ni and instability of a NCM crystal structure, causing a problem of difficulty in securing long life performance.

In the related art, various studies are currently performed to improve electrochemical performance of a lithium secondary battery by using an additive to coat a surface of a NCM positive electrode in an electrolyte solution or doping the surface of a NCM positive electrode.

The contents described as the related art have been provided only to assist in understanding the background of the present invention and should not be considered as corresponding to the related art known to those having ordinary skill in the art.

SUMMARY

In preferred aspects, provided is an electrolyte solution including an electrolyte solution additive to manufacture a lithium secondary battery and to improve electrochemical properties of the lithium secondary battery.

In an aspect, provided is an electrolyte solution for a lithium secondary battery, which may include: an electrolyte salt and an organic solvent. The electrolyte solution may include a borate-based salt compound represented by the following Chemical Formula 1 as a first additive:

[Chemical Formula 1]

wherein
$R_1$ to $R_8$ are independently of one another hydrogen a halogen, or an alkyl group having 1 to 5 carbon atoms substituted with a halogen.

The borate-based salt compound may include a compound represented by the following Chemical Formula 1a:

[Chemical Formula 1a]

The electrolyte solution may further include a compound represented by the following Chemical Formula 2 as a second additive:

[Chemical Formula 2]

The electrolyte solution may include the first additive in an amount of about 0.1 to 4 wt % based on the total weight of the electrolyte solution.

The electrolyte solution may include the second additive in an amount of about 0.1 to 10 wt % based on a total weight of the electrolyte solution.

The electrolyte salt may include one or more selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $Li(CF_3SO_2)_3C$, $LiAsF_6$, $LiSbF_6$, $LiAlCl_4$, $LiCH_3SO_3$, $LiCF_3SO_3$, $LiN(SO_2C_2F_5)_2$, $Li(CF_3SO_2)_2N$, $LiC_4F_9SO_3$, $LiB(C_6H_5)_4$, and $Li(SO_2F)_2N$ (LiFSI).

A concentration of the electrolyte salt in the electrolyte solution may be about 0.5 M to 1.0 M.

The organic solvent may include one or more selected from the group consisting of carbonate-based solvents, ester-based solvents, ether-based solvents, and ketone-based solvents.

In an aspect, provided is a lithium secondary battery, which may include: a positive electrode, a negative electrode, a separator interposed between the positive electrode and the negative electrode, and the electrolyte solution as disclosed herein.

The lithium secondary battery may further include vinyl carbonate in the electrolyte solution as disclosed herein.

The positive electrode may be formed of a positive electrode active material including Ni, Co, and Mn.

A ratio of Ni, Co, and Mn may be about 8:1:1.

In a further aspect, a vehicle (including an electric-powered vehicle) is provided that comprises an electrolyte solution as disclosed herein.

In a yet further aspect, a vehicle (including an electric-powered vehicle) is provided that comprises a battery as disclosed herein.

Other aspect of the invention are disclosed infra.

DETAILED DESCRIPTION

As described herein, objects, other objects, features, and advantages according to the present invention will be readily understood through the following preferred embodiments associated with the accompanying drawings. However, the present invention is not limited to the embodiments described herein and may also be embodied in other forms. Rather, the embodiments introduced herein are provided so that the invention may be made thorough and complete, and the spirit according to the present invention may be sufficiently conveyed to those skilled in the art.

In this specification, it should be understood that terms such as "comprise" or "have" are intended to indicate that there is a feature, a number, a step, an operation, a component, a part, or a combination thereof described on the specification, and do not exclude the possibility of the presence or the addition of one or more other features, numbers, steps, operations, components, parts, or combinations thereof. Further, when a portion such as a layer, a film, a region, or a plate is referred to as being "above" the other portion, it may be not only "right above" the other portion, or but also there may be another portion in the middle. On the contrary, when a portion such as a layer, a film, a region, or a plate is referred to as being "under" the other portion, it may be not only "right under" the other portion, or but also there may be another portion in the middle.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, where a numerical range is disclosed herein, such range is continuous, and includes unless otherwise indicated, every value from the minimum value to and including the maximum value of such range. Still further, where such a range refers to integers, unless otherwise indicated, every integer from the minimum value to and including the maximum value is included.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, the present invention will be described in detail.

In an initial formation process of a lithium secondary battery, a thin coat referred to as SEI is formed on each of a surface of a negative electrode and a surface of a positive electrode. An additive rapidly forms an SEI layer and is used for maintaining the SEI layer stably. In particular, the coat suppresses exfoliation of a layered structure of the negative electrode, and prevents direct reaction of an electrolyte solution on the surface of the negative electrode, thereby stabilizing the negative electrode.

In addition, recently, for increasing an energy density of a lithium secondary battery, development of a positive electrode active material having an increased Ni content of a NCM oxide (Ni-rich NCM) is promoted. However, though it is advantageous that the theoretical capacity of Ni-rich NCM is high, when a Ni content is increased, the capacity is increased, but the entire performance of a battery is deteriorated due to an increased structural disorderness and a volume change occurring with repeated charge and discharge.

Therefore, the stability of the lithium secondary battery to which a Ni-rich NCM material is applied may be increased by forming SEI on the surface of a positive electrode to prevent the electrolyte solution from being oxidized on the interface of the positive electrode-electrolyte solution and block elution of a nickel metal.

The electrolyte solution for a lithium secondary battery may include: an electrolyte salt and an organic solvent. Particularly, the electrolyte solution may include a borate-based salt compound represented by the following Chemical Formula 1 as a first additive:

[Chemical Formula 1]

wherein $R_1$ to $R_8$ are independently of one another hydrogen, a halogen, or an alkyl group having 1 to 5 carbon atoms substituted with a halogen.

Preferably, the compound may be represented by the following Chemical Formula 1a:

[Chemical Formula 1a]

In addition, the electrolyte solution may further include a compound represented by the following Chemical Formula 2 as a second additive, in addition to the borate-based salt compound represented by Chemical Formula 1:

[Chemical Formula 2]

The compound represented by Chemical Formula 2 may be vinyl carbonate which is used as a common additive of the electrolyte solution for a lithium secondary battery. As such, electrochemical properties related to the charge and discharge of the lithium secondary battery may be increased by further including vinyl carbonate as the second additive than to use the first additive alone.

Since the first additive and the second additive described above form a thin coat on the surface of the positive electrode at the initial formation step, performance degradation and deterioration due to repeated charge and discharge of a battery may be prevented.

Preferably, the first additive may be the borate-based salt compound. The electrolyte solution may include the first additive in an amount of about 0.1 to 4 wt %, based on the total weight of the electrolyte solution. When the content of the first additive is less than about 0.1 wt %, a coat may not be sufficiently formed on the surface of an electrode, and when the content is greater than about 4 wt %, an excessively thick coat may be rather formed.

Preferably, the second additive may be vinyl carbonate. The electrolyte solution may include the second additive in an amount of about 0.1 to 10 wt %, based on the total weight of the electrolyte solution. When the content of the second additive is less than about 0.1 wt %, a coat may be sufficiently formed on the surface of an electrode, and when the content is greater than about 10 wt %, an excessively thick coat may be rather formed.

However, the present invention is not necessarily limited to the ranges, and if necessary, an appropriate amount may be used.

Hereinafter, results of an experiment for electrochemical properties of a lithium secondary battery manufactured using the additive will be described.

The lithium secondary battery of the present invention includes a positive electrode, a negative electrode, a separator interposed between the positive electrode and the negative electrode, and an electrolyte solution.

The positive electrode is formed by including an NCM-based positive electrode active material composed of Ni, Co, and Mn, and in particular, NCM811 was used in the present Example. As the positive electrode active material, $LiCoO_2$, $LiMnO_2$, $LiNiO_2$, $LiNi_{1-x}Co_xO_2$, $LiNi_{0.5}Mn_{0.5}O_2$ $LiMn_{2-x}M_xO_4$ (M is Al, Li, or transition metals), $LiFePO_4$ and the like may be used, and other positive electrode active materials which may be used in the lithium secondary battery may be all used.

The positive electrode may be formed by further including a conductive material and a binder.

The conductive material is used for imparting conductivity to an electrode and any conductive material may be used as long as it is an electroconductive material which does not cause a chemical change, in the battery to be configured. As an example, metal powder such as natural graphite, artificial graphite, carbon black, acetylene black, ketjen black, carbon fiber, copper, nickel, aluminum, and silver, metal fiber, and the like may be used, and also, conductive materials such as a polyphenylene derivative may be used alone or in combination of one or more.

A binder serves to attach active material particles to each other well or attach the particles to a current collector well, which is for mechanically stabilizing an electrode. The active material may be stably fixed in a process of repeating insertion and desorption of lithium ions, thereby preventing binding between the active material and the conductive material from being loose. The binder may preferably include a polymer including polyvinyl alcohol, carboxymethyl cellulose, hydroxypropyl cellulose, diacetyl cellulose, polyvinyl chloride, carboxylated polyvinyl chloride, polyvinyl fluoride, and ethylene oxide, polyvinylpyrrolidone, polyurethane, polytetrafluoroethylene, polyvinylidene fluoride, polyethylene, polypropylene, styrene butadiene rubber, acrylated styrene butadiene rubber, epoxy resin, nylon, and the like may be used, but the present invention is not limited thereto.

The negative electrode includes one or more of carbon (C)-based or silicon (Si)-based negative electrode active materials; as the carbon-based negative electrode active material, at least one material selected from the group consisting of artificial graphite, natural graphite, graphitized carbon fiber, graphitized mesocarbon microbeads, fullerene, and non-crystalline carbon, and as the silicon-based negative, any one material of $SiO_x$ and a silicon carbon complex system may be used. In particular, in the present embodiment, an experiment was performed by producing a half cell using a lithium electrode or producing a complete battery using a graphite negative electrode active material.

The negative electrode may further include the binder and the conductive material like the positive electrode.

The electrolyte solution may be formed of an organic solvent and an additive.

The organic solvent may be one or more selected from the group consisting of carbonate-based solvents, ester-based solvents, ether-based solvents, and ketone-based solvents.

The carbonate-based solvent may include one or more selected from the group consisting of dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), fluoroethylene carbonate (FLC), and vinylene carbonate (VC). Further, as the ester-based solvent, γ-butyrolactone (GBL), n-methyl acetate, n-ethyl acetate, n-propyl acetate, and the like may be used, and as the ether-based solvent, dibutyl ether and the like may be used, but the present invention is not limited thereto.

The solvent may further include an aromatic hydrocarbon-based organic solvent. The aromatic hydrocarbon-based organic solvent may include benzene, fluorobenzene, bromobenzene, chlorobenzene, cyclohexylbenzene, isopropylbenzene, n-butylbenzene, octylbenzene, toluene, xylene, mesitylene, and the like, which may be used alone or in combination.

A separator prevents short circuit between the positive electrode and the negative electrode and provides a moving passage of lithium ions. As the separator, known ones, for example, a polyolefin-based polymer film such as polypropylene, polyethylene, polyethylene/polypropylene, polyethylene/polypropylene/polyethylene, and polypropylene/polyethylene/polypropylene films, or a multi-film thereof, a microporous film, woven fabric, and nonwoven fabric may be used. In addition, a film in which a resin having excellent stability is coated on a porous polyolefin film may be used.

In addition, the borate-based salt compound as the first additive and vinyl carbonate as the second additive may be used alone or in combination, with all usable secondary batteries such as an all-solid lithium secondary battery formed of a polymer solid electrolyte, an oxide solid electrolyte, or a sulfide solid electrolyte alone, an all-solid lithium secondary battery formed of solid electrolytes in which an electrolyte solution are mixed with a polymer solid electrolyte, an oxide solid electrolyte, a sulfide solid electrolyte or the like, or a water-based lithium secondary battery based on an aqueous solution, in addition to the lithium secondary battery formed of an electrolyte solution.

EXAMPLE

Production and Experiment of Batteries Corresponding to Comparative Example and Example
Production of Positive Electrode For production of a positive electrode, PVdF was dissolved in NMP to produce a binder solution.

A positive electrode active material and ketjen black used as a conductive material were mixed in the binder solution to produce a slurry, and the slurry was applied on both surfaces of an aluminum foil and dried.

Thereafter, a rolling process and a drying process were performed, and an aluminum electrode was ultrasonically welded to produce a positive electrode. In the rolling process, the thickness was adjusted to 120 to 150 μm.

Here, as the positive electrode active material, $Li_{1+x}[Ni_{0.8}Co_{0.1}Mn_{0.1}]O_2$ (−0.5<x<0) which was a mixed material of Ni, Co, and Mn at 8:1:1 was used.
Production of Negative Electrode A binder solution produced for production of a negative electrode and a negative electrode active material were mixed to produce a slurry, and the slurry was applied on both surfaces of an aluminum foil and dried.

Thereafter, a rolling process and a drying process were performed, and a nickel electrode was ultrasonically welded to produce a negative electrode. In the rolling process, the thickness was adjusted to 120 to 150 μm.

As the negative electrode active material, graphite was used at this time.

When a half cell was produced, a lithium electrode was used as a negative electrode.
Production of Electrolyte Solution As an organic solvent, a mixture of ethylene carbonate (EC), ethylmethyl carbonate (EMC), and diethyl carbonate (DEC) at a volume ratio of 25:45:30 was used, and as a lithium salt, 0.5 M $LiPF_6$ and 0.5 M LiFSI were dissolved in a solvent and an electrolyte solution was injected. In addition, according to each example, the first additive represented by Chemical Formula 1a was added at a different ratio to the organic solvent, and the second additive was added at 2 wt % together, based on the total weight of the electrolyte solution.

Hereinafter, mentioned wt % was based on the total weight of the electrolyte solution.
Production of Coin Cell A separator was interposed between the positive electrode and the negative electrode, which was then wound to produce a jelly roll. The produced jelly roll and electrolyte solution were used to produce a coin cell.
High Temperature Life Characteristic Experiment by Voltage Comparative Examples 1 to 3

Batteries were produced in the same manner as described above, except that the first additive represented by Chemical Formula 1a was not added, and the second additive was added at 2.0 wt %. A half-cell was produced using NCM811 as the positive electrode and a Li metal as the negative electrode and the experiment was performed.

In Comparative Example 1, a discharge termination voltage and a charge termination voltage were 2.7 V and 4.2 V, respectively, and charge and discharge were repeated twice at 0.1 C-Rate in an initial formation process and then repeated 48 times at 1 C-rate under a condition of 45° C.

In Comparative Example 2, a discharge termination voltage and a charge termination voltage were 2.7 V and 4.3 V, respectively, and charge and discharge were repeated twice at 0.1 C-Rate in an initial formation process and then repeated 48 times at 1 C-rate under a condition of 45° C.

In Comparative Example 3, a discharge termination voltage and a charge termination voltage were 2.7 V and 4.4 V, respectively, and charge and discharge were repeated twice at 0.1 C-Rate in an initial formation process and then repeated 48 times at 1.0 C-rate under a condition of 45° C.

A capacity at the first cycle and a capacity retention rate at the 50th cycle were measured, with the charge termination voltage being different.

Figure 1:
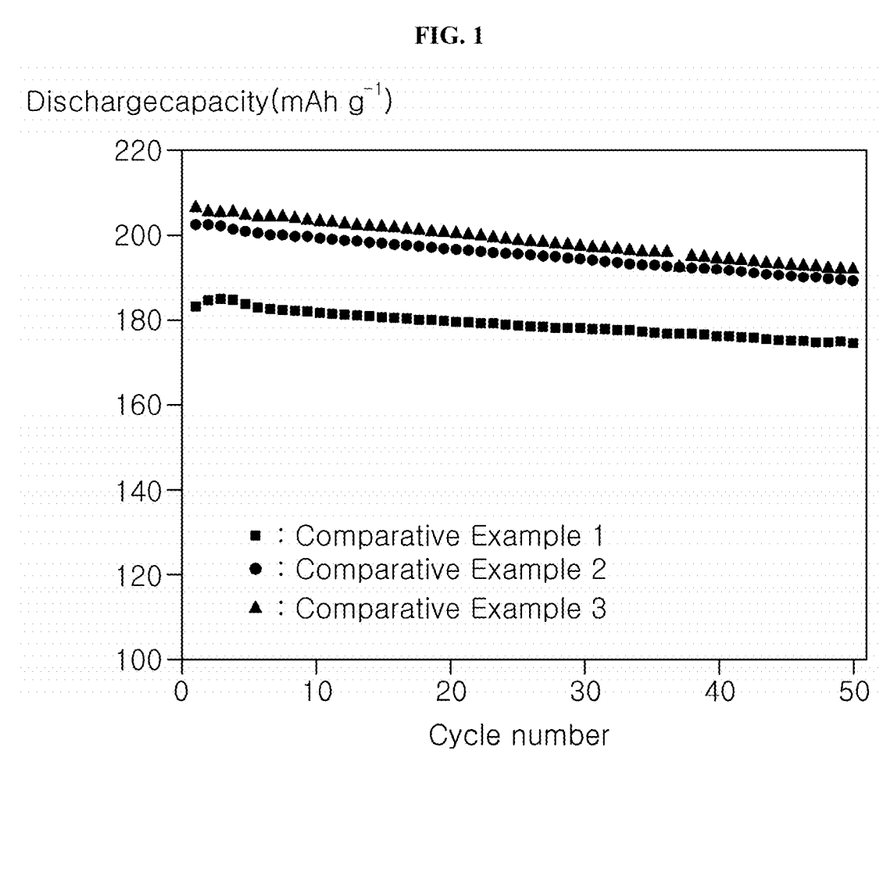
FIGS. 1 to 4 are graphs showing discharge capacities of Examples 1 to 5 according to exemplary embodiments of the present invention and Comparative Examples 1-5.

Table 1 shows the results therefor, and FIG. 1 is a graph representing the results therefor.

TABLE 1

|  | Additive vinyl carbonate | Voltage (V) | Initial capacity (mAh/g) | Capacity retention rate (%) |
| --- | --- | --- | --- | --- |
| Comparative Example 1 | 2.0 | 4.2 | 203 | 94.4 |
| Comparative Example 2 | 2.0 | 4.3 | 214 | 93.5 |
| Comparative Example 3 | 2.0 | 4.4 | 221 | 92.8 |

According to the experimental results, as the charge termination voltage was increased, the initial capacity was increased and the capacity retention rate was decreased. Moreover, the higher the charge voltage is, the higher the energy density is. However, capacity retention rate may decrease when the voltage was high, a side reaction such as decomposition of the solvent in the interface of the positive electrode occurred. When the charge voltage was higher, the energy density was increased, but the lithium secondary battery may be easily deteriorated.

High Temperature Life Characteristic Results by Electrolyte Solution Composition Examples 1 to 3

Batteries were produced in the same manner as described above. The first additive represented by Chemical Formula 1a had different contents depending on the Examples, and the second additive was added at 2.0 wt %. A half-cell was produced using a Li metal as the negative electrode and the experiment was performed.

In Example 1, a discharge termination voltage and a charge termination voltage were 2.7 V and 4.4 V, respectively, and charge and discharge were repeated twice at 0.1 C-Rate in an initial formation process and then repeated 48 times at 1 C-rate under a condition of 45° C.

In Example 2, a discharge termination voltage and a charge termination voltage were 2.7 V and 4.4 V, respectively, and charge and discharge were repeated twice at 0.1 C-Rate in an initial formation process and then repeated 48 times at 1 C-rate under a condition of 45° C.

In Example 3, a discharge termination voltage and a charge termination voltage were 2.7 V and 4.4 V, respectively, and charge and discharge were repeated twice at 0.1 C-Rate in an initial formation process and then repeated 48 times at 1.0 C-rate under a condition of 45° C.

A capacity at the first cycle and a capacity retention rate at the 50th cycle were measured, respectively.

Figure 2:
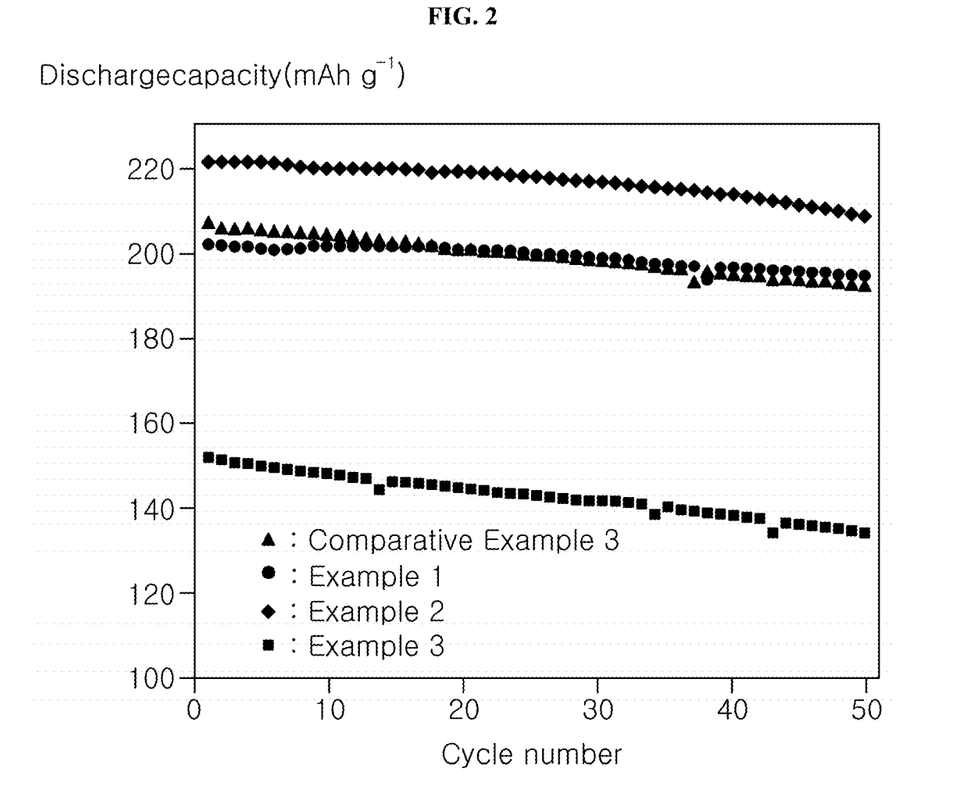

Table 2 shows the results therefor, and FIG. 2 is a graph representing the results therefor.

TABLE 2

| | Additive | | Initial | Capacity |
|---|---|---|---|---|
| | vinyl carbonate | First additive | capacity (mAh/g) | retention rate (%) |
| Comparative Example 3 | 2.0 | — | 206 | 92.8 |
| Example 1 | 2.0 | 1.0 | 202 | 96.2 |
| Example 2 | 2.0 | 2.0 | 222 | 94.1 |
| Example 3 | 2.0 | 5.0 | 152 | 88.1 |

According to the experimental results, when Comparative Example 3 in which the first additive was not used and Examples 1 to 3 were compared, the capacity retention rates after 50 cycles of the Examples except Example 3 were better than that of Comparative Example 3. In Example 3, the initial capacity was very low. Particularly, because a relatively large number of lithium ions were consumed in forming SEI to increase an irreversible capacity.

High Temperature Life Characteristic Results by Electrolyte Solution Composition Comparative Example 4 and Example 4

Batteries were produced in the same manner as described above. A full cell was produced using NCM811 as the positive electrode and graphite as the negative electrode and the experiment was performed.

In Comparative Example 4, 2.0 wt % of the second additive was added, a discharge termination voltage and a charge termination voltage were 2.7 V and 4.35 V, respectively, and charge and discharge were repeated twice at 0.1 C-Rate in an initial formation process and then repeated 98 times at 1 C-rate under a condition of 45° C.

In Example 4, 1.0 wt % of the first additive represented by Chemical Formula 1a was added, 2.0 wt % of the second additive was added, a discharge termination voltage and a charge termination voltage were 2.7 V and 4.35 V, respectively, and charge and discharge were repeated twice at 0.1 C-Rate in an initial formation process and then repeated 98 times at 1 C-rate under a condition of 45° C.

A capacity at the first cycle and a capacity retention rate at the 100th cycle were measured, respectively.

Figure 3:
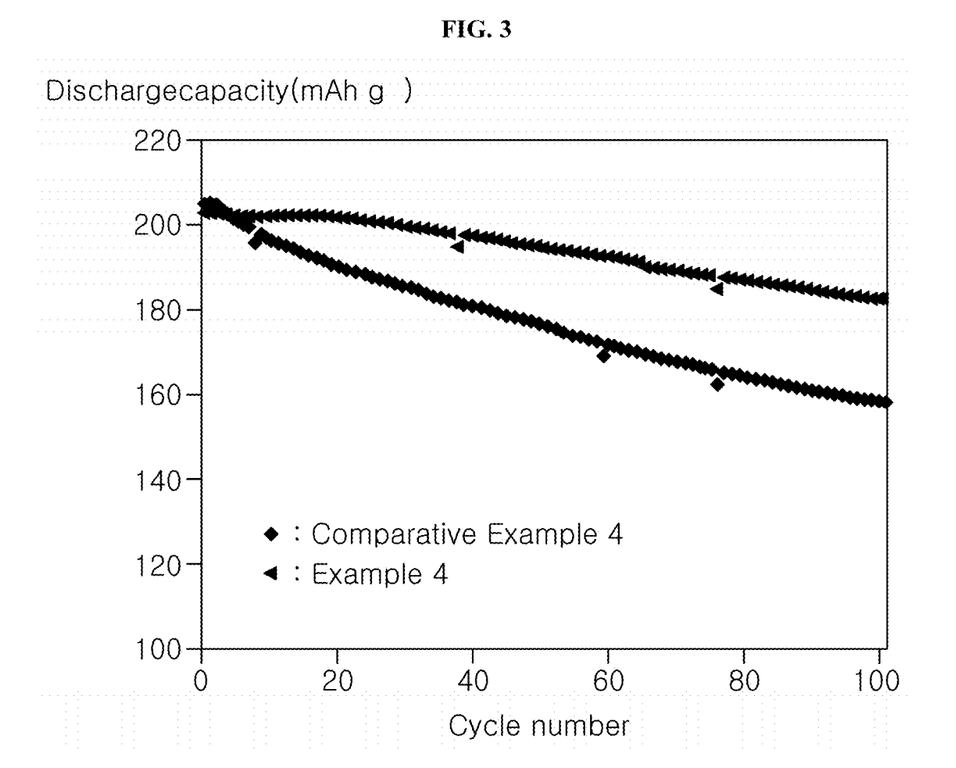

Table 3 shows the results therefor, and FIG. 3 is a graph representing the results therefor.

TABLE 3

| | Additive | | Initial | Capacity |
|---|---|---|---|---|
| | vinyl carbonate | First additive | capacity (mAh/g) | retention rate (%) |
| Comparative Example 4 | 2.0 | | 204 | 77.2 |
| Example 4 | 2.0 | 1.0 | 202 | 90.0 |

According to the experimental results, it is seen that though Example 4 had a lower initial capacity than that of Comparative Example 4, showed better performance in terms of the capacity retention rate.

Evaluation of Oxidation Stability by Electrolyte Solution Composition

Comparative Example 5 and Example 5

In Comparative Example 5, 2.0 wt % of the second additive was added, and in Example 5, 2.0 wt % of the first additive represented by Chemical Formula 1a and 2.0 wt % of the second additive were added. For measuring an oxidation decomposition potential using linear sweep voltammetry, a three-electrode cell was produced, a reference electrode was a Li electrode, and a scan rate was 1 mV/s.

Figure 4:
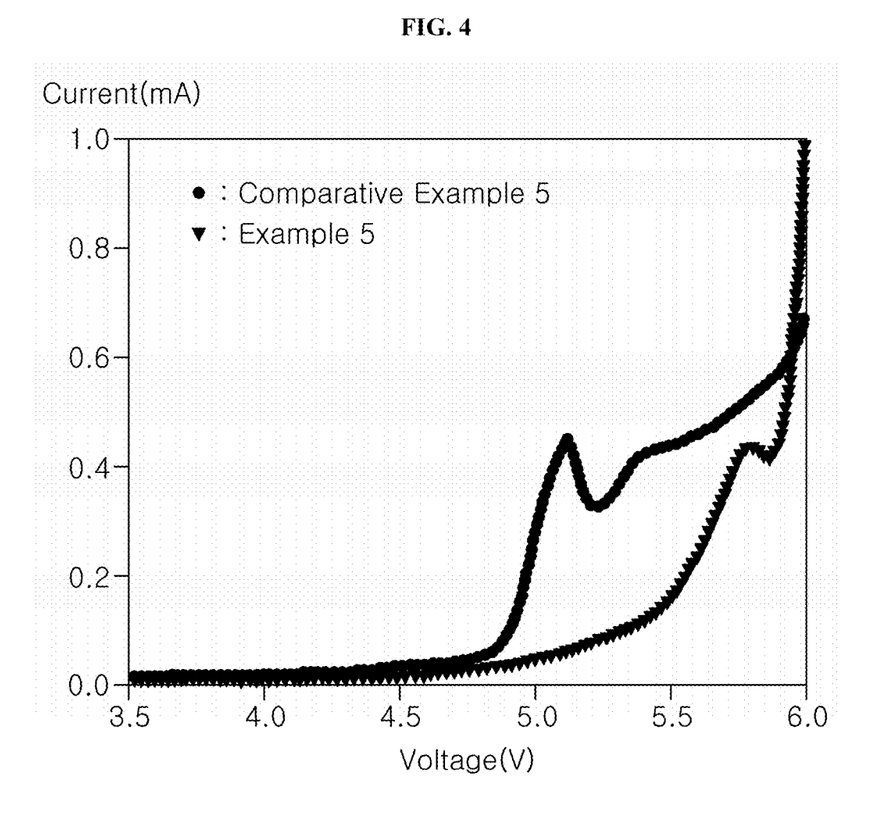

Table 4 shows the results therefor, and FIG. 4 is a graph representing the results therefor.

TABLE 4

| | Additive | | |
|---|---|---|---|
| | vinyl carbonate | First additive | Oxidation decomposition potential (V) |
| Comparative Example 5 | 2.0 | — | 4.7 |
| Example 5 | 2.0 | 2.0 | 5.3 |

As a result, Example 5 had a greater oxidation decomposition potential than Comparative Example 5. In Example 5, the oxidation and reduction reactions occurred slowly within 5.3 V in the electrolyte solution, which means that the stability of the electrolyte was high.

According to the experimental results, the energy density of the lithium secondary battery was able to be increased by adopting a Ni-rich NCM-based material as a positive electrode active material and using a voltage higher than 4.2 V, and the deterioration of the lithium secondary battery which may be caused when adopting the Ni-rich NCM-based material may be solved by the first additive. Particularly, a coat may be appropriately formed on the surface of the positive electrode by the first additive to suppress oxidation and decomposition of the electrolyte solution, which improves positive electrode interfacial stability to contribute to electrochemical performance improvement of the lithium secondary battery.

Figure 5:
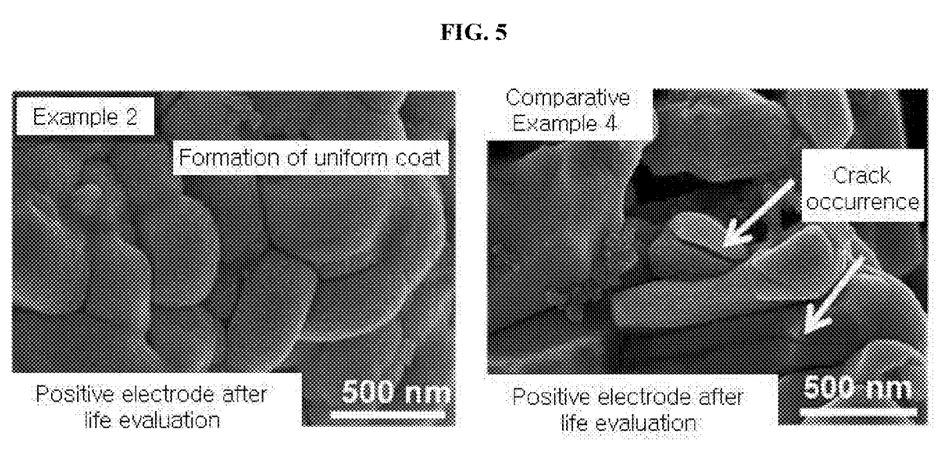
FIG. 5 is SEM photographs of positive electrodes of Example 4 and Comparative Example 4 after 100 cycles.

FIG. 5 is SEM photographs of the positive electrodes of Example 4 and Comparative Example 4 after 100 cycles. As shown in FIG. 5, a coat was formed uniformly on the surface of the positive electrode in Example 4, while cracks occurred in the middle of the surface of the positive electrode in Comparative Example 4.

Therefore, according to various exemplary embodiments of the present invention, the lithium secondary battery using the first additive had significantly improved electrochemical performance.

According to various exemplary embodiments of the present invention, since a protective film may be formed on the surface of a positive electrode of a lithium secondary battery, an electrolyte solution may be prevented from being oxidized and decomposed in the interface of the positive electrode, and the stability of the interface of the positive electrode may be improved by the protective film to improve electrochemical performance of the secondary battery. In particular, stable charge and discharge are allowed even at a voltage of 4.2 V or greater, and life stability may be secured at a high temperature and a high voltage.

Although the present invention has been shown and described with respect to exemplary embodiments, it will be apparent to those having ordinary skill in the art that the present invention may be variously modified and altered without departing from the spirit and scope of the present invention as defined by the following claims.

What is claimed is:

1. An electrolyte solution for a lithium secondary battery comprising:
    an electrolyte salt and an organic solvent,
    wherein the electrolyte solution comprises a borate-based salt compound represented by the following Chemical Formula 1 as a first additive:
    [Chemical Formula 1]

wherein the electrolyte solution further comprises a compound represented by the following Chemical Formula 2 as a second additive:

[Chemical Formula 2]

wherein the electrolyte solution comprises the first additive in an amount of about 1 to 2 wt %, based on a total weight of the electrolyte solution,
    wherein the electrolyte solution comprises the second additive in an amount of about 1 to 2 wt %, based on the total weight of the electrolyte solution, and
    wherein
    $R_1$ to $R_8$ are independently of one another hydrogen, a halogen, or an alkyl group having 1 to 5 carbon atoms substituted with a halogen.

2. The electrolyte solution for a lithium secondary battery of claim 1, wherein the borate-based salt compound is represented by the following Chemical Formula 1a:

[Chemical Formula 1a]

3. The electrolyte solution for a lithium secondary battery of claim 1, wherein the electrolyte salt comprises one or more selected from the group consisting of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $Li(CF_3SO_2)_3C$, $LiAsF_6$, $LiSbF_6$, $LiAlCl_4$, $LiCH_3SO_3$, $LiCF_3SO_3$, $LiN(SO_2C_2F_5)_2$, $Li(CF_3SO_2)_2N$, $LiC_4F_9SO_3$, $LiB(C_6H_5)_4$, and $Li(SO_2F)_2N$ (LiFSI).

4. The electrolyte solution for a lithium secondary battery of claim 1, wherein a concentration of the electrolyte salt in the electrolyte solution is about 0.5 M to 1.0 M.

5. The electrolyte solution for a lithium secondary battery of claim 1, wherein the organic solvent comprises one or more selected from the group consisting of carbonate-based solvents, ester-based solvents, ether-based solvents, and ketone-based solvents.

6. A lithium secondary battery comprising: a positive electrode, a negative electrode, a separator interposed between the positive electrode and the negative electrode, and the electrolyte solution of claim 1.

7. The lithium secondary battery of claim 6, wherein the positive electrode is formed of a positive electrode active material including Ni, Co, and Mn.

8. The lithium secondary battery of claim 7, wherein a ratio of Ni, Co, and Mn is about 8:1:1.

9. A vehicle comprising an electrolyte solution of claim 1.

10. A vehicle comprising a battery of claim 6.

* * * * *